United States Patent [19]

Drs

[11] Patent Number: 5,413,819
[45] Date of Patent: May 9, 1995

[54] SHOTCRETE COMPOSITIONS

[75] Inventor: Josef F. Drs, Vienna, Austria

[73] Assignee: Sandoz Ltd., Basel, Switzerland

[21] Appl. No.: 158,656

[22] Filed: Nov. 29, 1993

Related U.S. Application Data

[63] Continuation of Ser. No. 55,440, Apr. 29, 1993, abandoned, which is a continuation of Ser. No. 862,136, Apr. 2, 1992, abandoned, which is a continuation of Ser. No. 647,104, Jan. 25, 1991, abandoned.

[30] Foreign Application Priority Data

Jan. 27, 1990 [DE] Germany .................. 40 02 412.1

[51] Int. Cl.$^6$ .................. B05D 1/02; C04B 22/16
[52] U.S. Cl. .................. 427/427; 427/384; 427/397.7; 427/421; 106/713; 106/717; 106/724; 106/727; 106/806; 106/819; 106/823; 428/688; 428/703
[58] Field of Search ............... 106/708, 724, 727, 729, 106/804, 806, 808, 809, 823, 819, 717; 427/397.7, 427, 421, 384; 428/688, 703

[56] References Cited

U.S. PATENT DOCUMENTS

| | | | |
|---|---|---|---|
| 2,783,157 | 2/1957 | Grant et al. | 106/804 |
| 3,215,548 | 11/1965 | Vollick | 106/725 |
| 3,794,506 | 2/1974 | Schmidt | 106/717 |
| 4,057,528 | 11/1977 | Hunt | 524/8 |
| 4,190,454 | 2/1980 | Yamagisi et al. | 106/708 |
| 4,264,367 | 4/1981 | Schutz | 106/728 |
| 4,468,252 | 8/1984 | Crump et al. | 106/727 |
| 4,472,200 | 9/1984 | Crump et al. | 106/717 |
| 4,507,154 | 3/1985 | Bürge et al. | 106/728 |

(List continued on next page.)

FOREIGN PATENT DOCUMENTS

| | | |
|---|---|---|
| 120237 | 2/1984 | European Pat. Off. . |
| 166798 | 1/1986 | European Pat. Off. . |
| 246181 | 3/1986 | European Pat. Off. . |
| 174053 | 11/1988 | European Pat. Off. . |
| 324501 | 7/1989 | European Pat. Off. . |
| 352583 | 1/1990 | European Pat. Off. . |
| 402319 | 12/1990 | European Pat. Off. . |

(List continued on next page.)

OTHER PUBLICATIONS

Journal "Il Cemento" Feb. 1980 (pp. 73, 96–107, 112, 120, 138–143).

Paper (source unknown) "Appln. of the wet shotcreting method with aluminate accelerator for the construction of a motorway tunnel". [no date].

Information Bulletin from Schwing, "Principle of wet–spraying" (in German). [no date].

Thesis of Dieter Mai at the Technical University of Clausthal, 1983, pp. 5, 6, 55, 59, 62, 80, 81 (in German). [no month].

Information Bulletin for German Assoc. for Mineral Oil Research and Coal Chemistry, "Strength retention of hardened cement under high pressure", pp. 40, 42, 47, 78, and 79 [no date].

(List continued on next page.)

Primary Examiner—Anthony Green
Attorney, Agent, or Firm—Robert S. Honor; Carl W. Battle; Carol A. Loeschorn

[57] ABSTRACT

The storage and processing times of sprayed concrete can be significantly extended by the addition of a retarder, a chemical compound which is capable of chelating with calcium ions. Preferred retarders are phosphonic acid derivatives which have at least one amino and/or hydroxyl group. The retarder can be used for both wet- and dry-sprayed concrete, the usual accelerators can be used for activation, and the strength is not adversely affected.

11 Claims, No Drawings

U.S. PATENT DOCUMENTS

| | | |
|---|---|---|
| 4,676,832 | 6/1987 | Childs et al. .................. 106/727 |
| 4,772,327 | 9/1988 | Allemann et al. ............... 106/726 |
| 4,904,503 | 2/1990 | Hilton et al. .................. 106/692 |
| 4,931,098 | 6/1990 | Danielssen et al. ............. 106/638 |
| 4,964,731 | 10/1990 | Vittanen ....................... 366/11 |
| 4,964,917 | 10/1990 | Bobrowski et al. .............. 106/804 |
| 5,114,487 | 5/1992 | Gartshore et al. .............. 106/695 |
| 5,350,450 | 9/1994 | Hamabe et al. ................. 106/802 |

FOREIGN PATENT DOCUMENTS

| | | |
|---|---|---|
| 1471387 | 11/1968 | Germany . |
| 2453527 | 5/1976 | Germany . |
| 2755551 | 6/1978 | Germany . |
| 3130459 | 6/1983 | Germany . |
| 52-76328 | 6/1977 | Japan . |
| 52-089121 | 7/1977 | Japan . |
| 59-156950 | 9/1984 | Japan . |
| 01257156 | 10/1989 | Japan . |
| 257968 | 5/1949 | Switzerland . |
| 601132 | 6/1978 | Switzerland . |
| 646124 | 11/1984 | Switzerland . |
| 1480775 | 7/1977 | United Kingdom . |
| 2157279A | 10/1985 | United Kingdom . |

OTHER PUBLICATIONS

Report BML 85.101 by O. A. Opsahl, 2 volumes (I in English and II in Norwegian), dated Nov. 10, 1985.

Concrete Admixtures Handbook, V. S. Ramachandran, Properties, Science, and Technology, 1984, pp. 303–336 & 547–553, [no month].

Concrete, Mindess and Young, 1981 Pretice Hall, Englewood Cliffs, N.J., p. 28 [no month].

Chemical Abstracts, vol. 105, No. 2, Abstract No. 11015W. (Jul. 1986).

SHOTCRETE COMPOSITIONS

This is a continuation of application Ser. No. 08/055,440, filed Apr. 29, 1993, which in turn is a continuation of application Ser. No. 07/862,136, filed Apr. 2, 1992, which in turn is a continuation of application Ser. No. 07/647,104, filed Jan. 25, 1991, all of which are now abandoned.

This invention relates to the spraying of concrete mixes and to concrete mixes adapted to be sprayed.

In the process of spraying concrete by the wet spraying process, a ready-made concrete mix of pumpable consistency is conveyed by pumping or pneumatically conveying to a nozzle through tubing or hose lines. At the nozzle, compressed air is introduced and this breaks up the compact concrete strand which is forced from the nozzle and can be sprayed on to a substrate. Rapid setting or hardening of this sprayed concrete may be achieved by the introduction into the concrete of a hardening activator which can be added by means of special dosing devices or by including it in the compressed air.

In order to avoid clogging the lines with partially- or completely-hardened concrete, they must be emptied and cleaned every time work is interrupted. For this reason in particular, the wet spraying of concrete has found only a few uses.

In dry spraying processes, a dry mix consisting of cement, aggregates and optional admixtures and blending agents is sprayed, it being moistened with water in the nozzle. Because the aggregates have their own moisture (about 2 to 6%), water is thus incorporated in the dry mix and prehydrates the cement. Therefore, so as to permit satisfactory application of the sprayed concrete, a processing time of about 1.5 hours should not normally be exceeded. However, unforeseen interruptions to work do occur, particularly during restoration work, when protecting slopes or during extensive spray work. This can lead to working times of several hours and thus cause a significant reduction in quality up to the point where the dry mix cannot be used at all.

There therefore exists a problem, both with wet sprayed concrete and with dry sprayed concrete, which has not been solved with conventional retardants which are used in other concrete mixes, as it was feared that they would have too great an influence on setting.

It has now been found that by incorporating certain stabilizers into the sprayed concrete, a longer working time can be attained, so that interruptions of several hours' duration to work can be tolerated. In spite of this, the stabilized concrete mix can be activated at any time by incorporating the usual accelerators, and it can be sprayed in the customary way, without the compressive strength of the sprayed concrete suffering. During any interruption, no kind of cleaning or attention is necessary. In addition, with dry spraying processes, there is no damaging effect as a result of, and even improvement (reduction) in, rebound and dust formation, and the increased danger of blockages in the feed pipe is avoided.

The invention therefore provides a process of spraying concrete which comprises at least one chemical compound which is capable of chelating with calcium. Such chemical compounds both stabilize the concrete mixture and retard the setting time thereof, and they can be used with both wet and dry spraying of concrete. These chemical compounds will hereinafter be described as "stabilizers". The concrete mixtures may be activated by conventional accelerators which may be added at the spraying stage.

The stabilizers which also act as retarders all have the ability to form chelates with calcium, and any compound which complies with this requirement is a stabilizer for the purposes of this invention. There are a number of types of preferred stabilizer. One of these types is the class of phosphonic acid derivatives which have hydroxy or amino groups. One preferred group of such materials is the series of compounds marketed by the Monsanto Co. under the trade mark "DEQUEST". A list of typical "DEQUEST" compounds with their chemical identities is given below:

"DEQUEST" 2000: aminotri(methylenephosphonic acid)
"DEQUEST" 2006: aminotri(methylenephosphonic acid)-pentasodium salt
"DEQUEST" 2010: 1-hydroxyethylidene-1,1-diphosphonic acid
"DEQUEST" 2016: 1-hydroxyethylidene-1,1-diphosphonic acid-tetrasodium salt
"DEQUEST" 2041: ethylenediaminetetra(methylenephosphonic acid)
"DEQUEST" 2047: ethylenediaminetetra(methylenephosphonic acid)-calcium/sodium salt
"DEQUEST" 2051: hexamethylenediaminetetra(methylenephosphonic acid)
"DEQUEST" 2054: hexamethylenediaminetetra(methylenephosphonic acid)-potassium salt
"DEQUEST" 2060: diethylenetriaminepenta(methylenephosphonic acid)
"DEQUEST" 2066: diethylenetriaminepenta(methylenephosphonic acid)-sodium salt.

It is permissible to use blends of two or more of these phosphonic acid-based stabilizers.

Other classes of stabilizer which perform this chelating function and which are useful in the working of this invention include:
hydroxycarboxylic acids and their salts, for example, salicylic, citric, lactic, gluconic, tartaric, muconic and glucoheptanoic acids;
polycarboxylic acids and their salts, including polymeric acids, for example, maleic, fumaric, itaconic, succinic, malonic and phthalic acids and polyacrylic, polymethacrylic and polyfumaric acids, the polymerised acids preferably being of low molecular weight;
antioxidants, for example, ascorbic and isoascorbic acids;
polymers, for example, acrylic acid copolymers containing sulphonic acid groups and polyhydroxysilanes, these polymers preferably having a low molecular weight;
aldoses and ketoses, for example, sugar and corn syrup and lignosulphonates, for example, calcium lignosulphonate;
inorganic complexing agents, for example, phosphates and borates;
organic complexing agents, for example, EDTA and NTA; and
zeolites.

Again, it is permissible to use blends of two or more of these stabilizers. The preferred stabilizers of this type are hydrocarboxylic acids, polyphosphates, pyrophosphates and mixtures thereof.

Preferred stabilizers are mixtures of at least one phosphonic acid derivative and at least one other stabilizer.

Since many of the stabilizers which do not belong to the group of phosphonic acid derivatives also have water-reducing properties, these also increase the compressive strength of the hardened concrete. A typical combination is a phosphonic acid derivative with gluconic acid or a salt thereof.

Especially preferred stabilizers are mixtures of one of the previously-listed phosphonic acid derivatives with citric acid and salts thereof, in particular aminotri(methylenephosphonic acid) and citric acid or a salt thereof. Preferred ratios of the above-mentioned phosphonic acid derivatives to citric acid are from 1:1 to 2:1.

Accelerators which may be used in this invention are products which are normally employed in sprayed concrete. Thus, not only alkali aluminates and their mixtures with potash, but also silicates such as water glass, can start cement hydration without the additional use of another activator, and rapid hardening of the sprayed concrete follows. The quantity used is, as always, dependent on many marginal conditions, and varies between 1.0 and 25% of the cement weight, preferably 3-10%. Quantities for the dry spraying process are about 6% by weight of the binding agent (cement or cement+mineral admixtures), and for wet spraying about 8%.

The quantities of stabilisers and accelerators, which are used in the process according to the invention as a percentage by weight of the concrete mix, depend on various factors with which the skilled person is familiar. These include the following factors:

1) The formulation of the stabiliser and activator employed.
2) The duration of desired delay (normally 2-18 hours (overnight), occasionally also up to 72 hours (weekend)).
3) The type of cement. ASTM types I-V may be used, but types I and II are preferred. The content of mineral admixtures are taken into account in addition to the cement content.
4) The time between producing the concrete mix and adding the stabiliser. The latter may be added to the unused part of the concrete mix as long as the concrete mix still has the required properties of fresh concrete. The stabiliser is preferably added up to a maximum of 1.5 hours after producing the mix. The longer this time interval, the more stabiliser needed.
5) The temperature of the concrete mix. The higher the temperature, the quicker the mix hardens and the more stabiliser correspondingly needed. Because of the more rapid hardening, the stabiliser should be added within one hour of producing the concrete mix at temperatures of above 20° C.

The stabilizers for use in this invention are used typically in the proportion of from 0.1 to 5.0%, preferably from 0.4 to 2.0%, by weight of the cement and any mineral admixtures present.

Other admixtures may also be added to the concrete. A particularly useful class of such admixtures is that of water-reducing admixtures. Preference is given to those which are designated as "Type A admixtures" in ASTM C 494. These water-reducing agents themselves have no significant retarding or accelerating properties. Such a product is sold by the company Master Builders Inc. under the trade name "Pozzolith Polyheed" and by MBT under the trade name of "Rheobuild" 1000. Such admixtures are used typically in proportions of up to 2.5% by weight of cement and optional mineral admixtures.

The concrete spraying process according to the invention may be carried out using conventional apparatus and techniques. A useful feature of the invention is the ability to provide a mixture for dry spraying, requiring only the addition of water at the nozzle. There is therefore also provided a dry mixture spraying concrete composition comprising from 12 to 20% by weight of cement, from 0.4 to 2.5% by weight of the composition of mineral admixtures, from 68 to 80% by weight of the composition of aggregate, from 0.1 to 5.0% by weight of cement+mineral admixtures of at least one stabilizer which is a chemical compound capable of forming a chelate with calcium, up to 2.5% by weight of cement of admixtures other than mineral admixtures and and a maximum water content of 10% by weight of the composition.

The invention is illustrated more fully by the following examples. The percentages are by weight, and the temperatures are given in degrees celsius.

EXAMPLE 1 (wet sprayed concrete)

The concrete spraying machine employed is a "Guni" 48 concrete pump (ex Turbosol) with a 40 m hose line (diameter 5 cm). The sprayed concrete is a concrete mix consisting of portland cement, water and an aggregate of grain size 0/4 mm, sieve line B and high content of fine particle sizes. The water/cement ratio is about 0.56 and the slump about 60 cm. The stabilizer is an aqueous solution of 12.8% aminotri-(methylenephosphonic acid) and 8% citric acid, and the accelerator is an aqueous solution of sodium aluminate and potash ("Barra gunite" F 96 from MBT). In order to test the ready-mixed concrete for consistency in the pump and in the hose lines, a concrete mix of the composition:

| | |
|---|---|
| portland cement 375 | 450 parts |
| rock dust | 50 parts |
| sand 0/1 | 680 parts |
| sand 1/4 | 1000 parts |
| stabilizer | 9 parts |
| water | 261 parts | is mixed in the concrete mixer, filled into the pump, pumped in a circular motion, the pump is stopped for a long period, started again and the concrete consistency, the pump pressure and the concrete temperature are measured.

From the start to the end of the test (after 5 hours) the pump pressure remains the same at 10 bar. The temperature of the concrete in the pump remains constant over 4 hours and is 12°, and in the hose which lies in the sun the temperature increases to 16°. The consistency (as measured by flow table) drops from 62 cm in the first hour by 1 cm to 61 cm, and after a further 1.5 hours drops to 56 cm, which, however, has no effect on the pump pressure. By supplementing the concrete mix with fresh concrete, the consistency is increased again to 62 cm, and within a further 2.5 hours drops to 58 cm.

In the spraying of industrially-mixed concrete of similar composition, adding accelerators (8% based on cement weight), it was established that, despite the relatively high dose of stabilizer of 2% of the cement weight, this mixture has similar strength to concrete without a stabilizer. Thus, the reactability of the system within a few hours is independent of the age of the concrete, in contrast to conventional sprayed concrete which has poorer reactivity as its age increases.

EXAMPLE 2 (dry spraying process)

A dry mix is prepared from 400 parts of portland cement 375 and 1850 parts of aggregate (grain size 0/8, sieve line B, 5% moisture), and during mixing in the mixing vessel, a stabilizer as in example 1 is added in a quantity of 1.3% of the cement mass (i.e. 5.2 parts). Mixing continues for 5 minutes, and two mixes are compared: one is sprayed 16 hours after preparation and the second 1 hour after preparation, using 6% "Barra gunite" LL accelerator (commercial powdered type of gunite based on aluminate). The strength corresponds to values which are usual in the practice of sprayed concrete. No difference can be established between mixes which have been stored for a short and long times. The compression strength after 7 and 28 days for the processing time of 16.5 hours was higher than when stored for one hour.

I claim:

1. A shotcreting process for spraying a substrate with concrete comprising the steps of forming a pumpable concrete mix, pumping said concrete mix to a spray nozzle, adding an accelerator to the concrete mix in the vicinity of the spray nozzle to form sprayable concrete and spraying the sprayable concrete on the substrate, the pumpable concrete mix comprising a stabilizer which is a phosphonic acid derivative capable of forming a chelate with calcium, cement, aggregate and optionally, one or more mineral admixtures.

2. A shotcreting process according to claim 1 wherein the process is a wet-spraying process and the concrete mix is a ready-made concrete mix.

3. A shotcreting process according to claim 1 wherein the process is a dry-spraying process and the concrete mix is a dry concrete mix.

4. A shotcreting process according to claim 1 wherein the stabilizer is a phosphonic acid derivative having at least one group selected from hydroxy and amino.

5. A shotcreting process according to claim 4 wherein the phosphonic acid derivative is selected from the group consisting of aminotri(methylenephosphonic acid), aminotri(methylenephosphonic acid)pentasodium salt, 1-hydroxyethylidene-1,1-diphosphonic acid, 1-hydroxyethylidene-1,1-diphosphonic acid tetrasodium salt, ethylenediaminetetra(methylenephosphonic acid), ethylenediaminetetra(methylenephosphonic acid)-calcium/sodium salt, hexamethylenediaminetetra(methylenephosphonic acid), hexamethylenediaminetetra(methylenephosphonic acid)-potassium salt, diethylenetriaminepenta(methylenephosphonic acid) and diethylenetriaminepenta(methylenephosphonic acid)-sodium salt.

6. A shotcreting process according to claim 1 wherein the concrete mix additionally includes a nonphosphonic acid derivative stabilizer which is capable of forming a chelate with calcium.

7. A shotcreting process according to claim 6 wherein the nonphosphonic acid derivative stabilizer is citric acid or a salt thereof.

8. A shotcreting process according to claim 1 wherein the stabilizer is present in an amount of from 0.1 to 5.0% by weight based on the combined weight of said cement and mineral admixtures.

9. A shotcreting process according to claim 1 wherein the accelerator is a mixture of an alkali aluminate and potash.

10. A shotcreting process according to claim 1 wherein the accelerator is present in an amount of from 1 to 25% by weight based on the combined weight of said cement and mineral admixtures.

11. Sprayed concrete on a substrate which has been applied by the shotcreting process of claim 1.

* * * * *